J. FARRINGTON.
Harvesters.
No. 134,531. Patented Jan. 7, 1873.
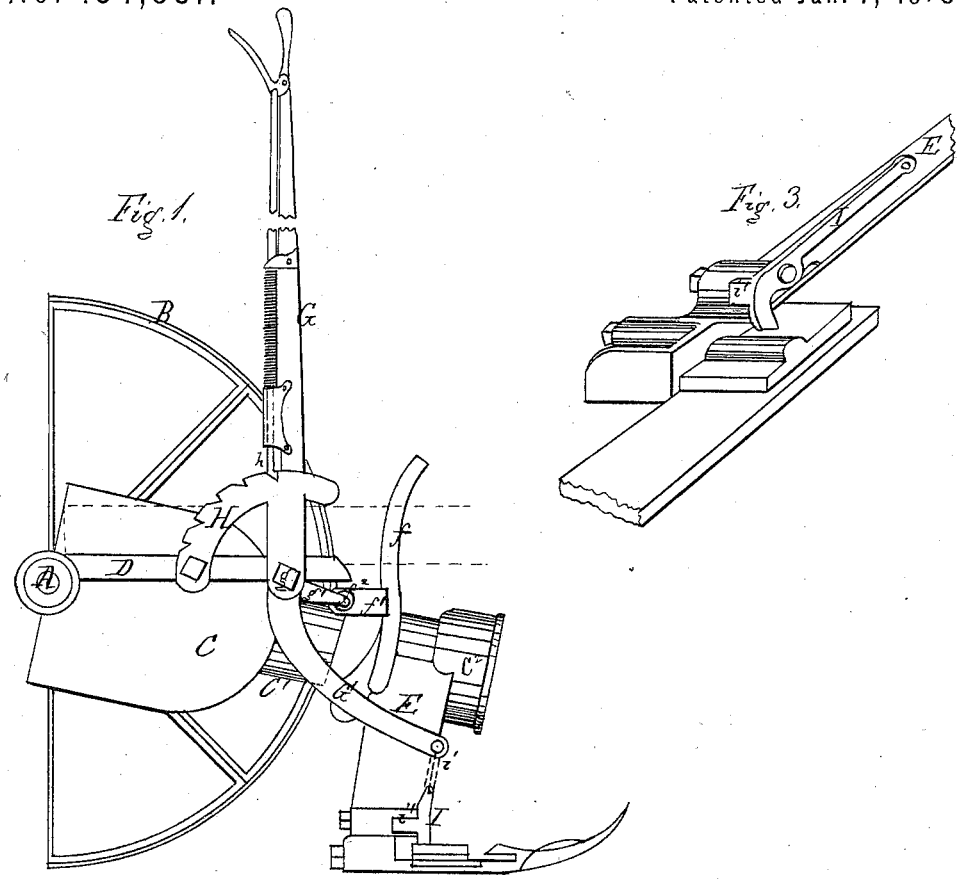
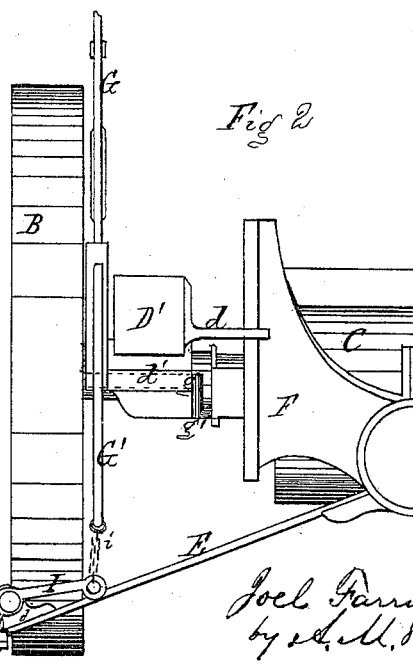
Witnesses
E. B. Ellicott
Alex. Mahon
Joel Farrington
by A. M. Smith
Attorney

UNITED STATES PATENT OFFICE.

JOEL FARRINGTON, OF CORRY, PENNSYLVANIA.

IMPROVEMENT IN HARVESTERS.

Specification forming part of Letters Patent No. 134,531, dated January 7, 1873.

*To all whom it may concern:*

Be it known that I, JOEL FARRINGTON, of Corry, county of Erie, State of Pennsylvania, have invented certain new and useful Improvements in Harvesting-Machines, of which the following is a full, clear, and exact description, reference being had to the accompanying drawing making part of this specification, in which—

Figure 1 is a partial side elevation taken from the grain side; Fig. 2 is a similar front elevation; and Fig. 3 is a perspective view of a portion of the finger-bar and coupling bar or brace detached, showing the arrangement of the locking or gag levers relative to said bars.

Similar letters of reference denote corresponding parts wherever used.

My invention relates to a novel construction and arrangement of means for raising, lowering, and controlling the cutting apparatus while the machine is in operation, and will be best understood from the following description with reference to the drawing.

A represents the main axle; B, one of the main driving and carrying wheels mounted thereon; C, the main or vibrating gear or cutter-frame, provided with sleeves and mounted on the main axle; and D, the pole or tongue plate or frame, also provided with a sleeve and mounted on the axle or on a sleeve of frame C. The tongue D' is rigidly connected to plate D in position shown in dotted lines, Fig. 1. The frame C is provided, at its forward end, with a crank-shaft sleeve, $C^1$, the forward end of which is armed with a coupling-sleeve or hood, $C^2$, to which the coupling brace or bar E is bolted. The sleeve $C^1$ in rear of bar E has bolted or otherwise firmly attached to it an inwardly-projecting arm, F, the inner expanded end or horn of which is provided with a flange or lip, $f$, curved in its forward edge for a portion of its length in the arc of a circle, of which the axle is the center. A notched plate, $d$, bolted to the tongue or tongue-plate, embraces and serves to guide the flange $f$, and through said flange the frame C, in its vertical movement, and to steady said frame and the tongue in their relation to each other. The tongue-plate is provided with a transverse sleeve-bearing, $d'$, in which is mounted a rock-shaft, $g$, (shown in dotted lines, Fig. 2,) which forms the fulcrum of the lifting-lever G. The shaft $g$, which is rigidly connected at one end with lever by means of a squared shank, or in any convenient manner, so as to turn with or be operated by said lever, is provided at the other end with a crank-arm, $g'$, the wrist of which enters a slot or perforation in a spur or arm, $f^1$, attached to or formed upon arm F of the vibrating cutter-frame. The slot or perforation $f^2$, in arm $f^1$, is slightly enlarged to provide for the freedom of movement required to permit the vibration of the frame C and the crank-wrist and its lever around different centers.

By this arrangement of the lever G and crank $g'$, in connection with frame C, it will be seen that any vibration or movement of the lever backward or forward imparts a corresponding rising or falling movement to the vibrating end of frame C.

A curved notched rack, H, in connection with a spring-latch, $h$, serves to hold the lever and frame at any desired adjustment. The lever G extends below its fulcrum in the form of a curved arm, G', Fig. 1, and at its lower forward end is connected by a link or cord, $i$, with one end of a locking or gag lever, I, pivoted in a lug, $j$, on the coupling-arm E. The other end of lever I overhangs the heel-extension of the hinged finger-bar, and is provided on its rear face with a spur, $i'$, which extends over the coupling-bar, and serves to limit the movement or throw of lever I. The spur $i'$ may, if desired, be made adjustable on lever I, by means of a slot and set-screw, or in any convenient manner.

In some instances, as, for example, where a butt-joint hinge is employed to connect the finger-bar with the coupling-arm, or where it is desired only to raise the inner end of the finger-bar, the gag-lever I may be dispensed with, and the lifting chain or cord $i$ in such case may be connected directly with the coupling-arm E.

The operation of the several parts embraced in the foregoing description will be readily understood. If, for example, the cutting apparatus is resting upon the ground, and it is desired to raise it for passing an obstruction, or for any purpose, the attendant in his seat on the machine seizes lever G, and, releasing its holding latch or pawl, draws the lever backward. By this movement the first effect is to raise the forward end of the vibrating frame C through the medium of the rock-shaft and crank $g'$, as above described, and simultaneously therewith, through arm G' of the lever, to take up the slack in chain or cord $i$; second, to raise the end of lever I, to which said chain is connected, to the extent of movement permitted to said lever by spur or stop $i'$, and thereby to gag or lock the hinge or pivot of the finger-bar; and, lastly, by the continued backward movement of lever G, to raise the cutting apparatus bodily, said cutting apparatus rising with the vibrating end of frame C, and also vibrating upon or around said vibrating end of the frame C, as a movable center.

In the construction above described, it will be seen that the finger-bar, when not raised and suspended or locked by the action of the lever, is entirely free to follow at each end the undulations in the surface of the ground over which it is drawn independently of the main frame and carrying-wheels, being what is usually termed a "floating" bar.

Parts of the machine not particularly described may be of any usual or desired construction and arrangement.

Having now described my invention, what I claim is—

1. The crank-arm $g'$ for raising the vibrating end of the cutter-frame, in combination with the lifting-lever G G', for raising and lowering the hinged finger-bar, substantially as described.

2. The combination of lever G G', crank-arm $g'$, and gag-lever I with the vibrating frame and hinged finger-bar, all arranged and operating substantially as described.

3. The gag-lever I provided with the overhanging spur or stop $i'$, and arranged in the described relation to the hinged finger-bar and lifting-lever G, as and for the purpose specified.

JOEL FARRINGTON.

Witnesses:
E. D. INGERSOLL,
JOHN N. BRIGHT.